C. W. HOBBS.
FLY LEAFING MACHINE.
APPLICATION FILED NOV. 11, 1911.

1,171,436.

Patented Feb. 15, 1916.
5 SHEETS—SHEET 1.

Witnesses
R. D. Tolman.
Penelope Comberbach.

Inventor
Clarence W. Hobbs.
By Rufus B. Fowler
Attorney

C. W. HOBBS.
FLY LEAFING MACHINE.
APPLICATION FILED NOV. 11, 1911.

1,171,436.

Patented Feb. 15, 1916.
5 SHEETS—SHEET 2.

Witnesses.
R. D. Holman
Penelope Cumberbach.

Inventor
Clarence W. Hobbs.
By Rufus B. Fowler
Attorney

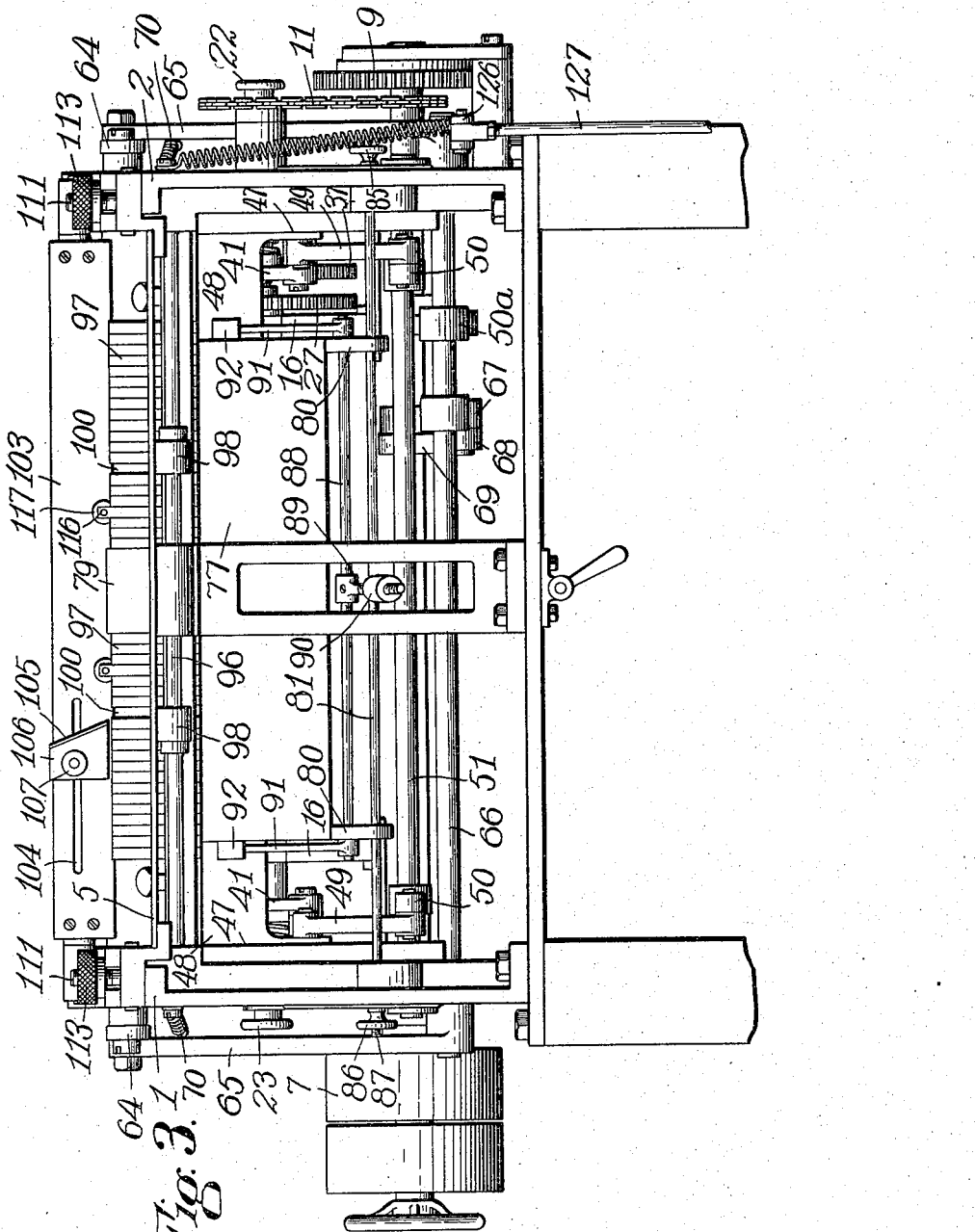

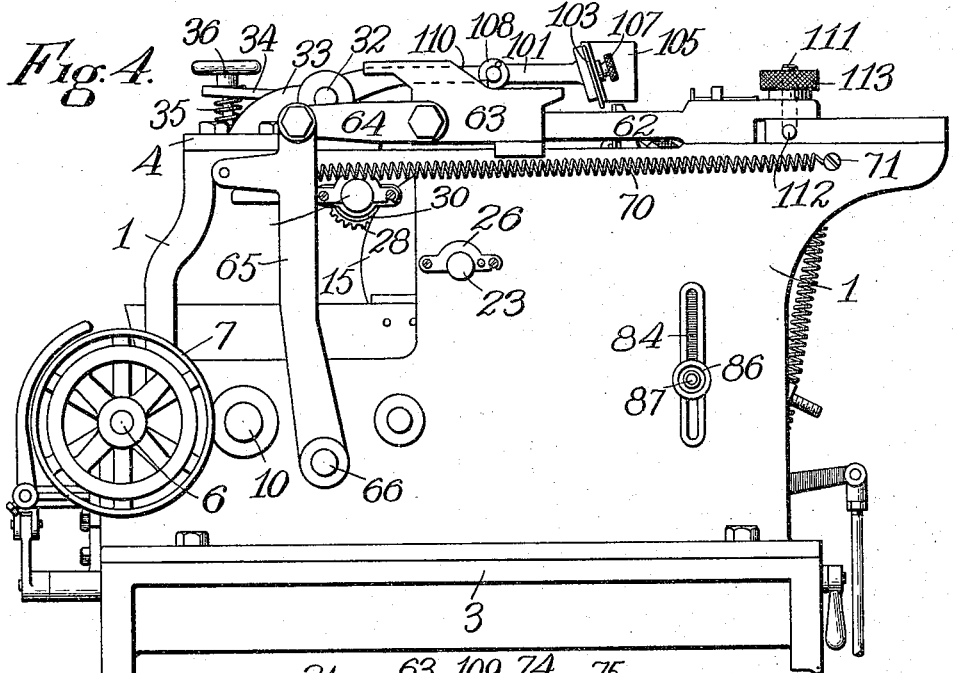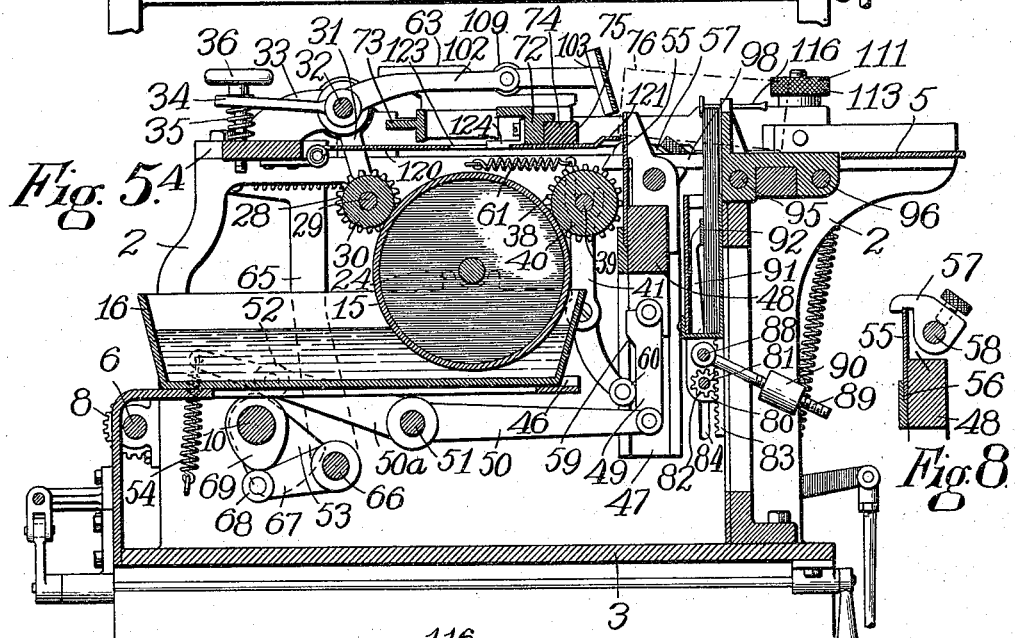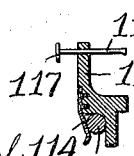

C. W. HOBBS.
FLY LEAFING MACHINE.
APPLICATION FILED NOV. 11, 1911.
1,171,436.
Patented Feb. 15, 1916.
5 SHEETS—SHEET 5.
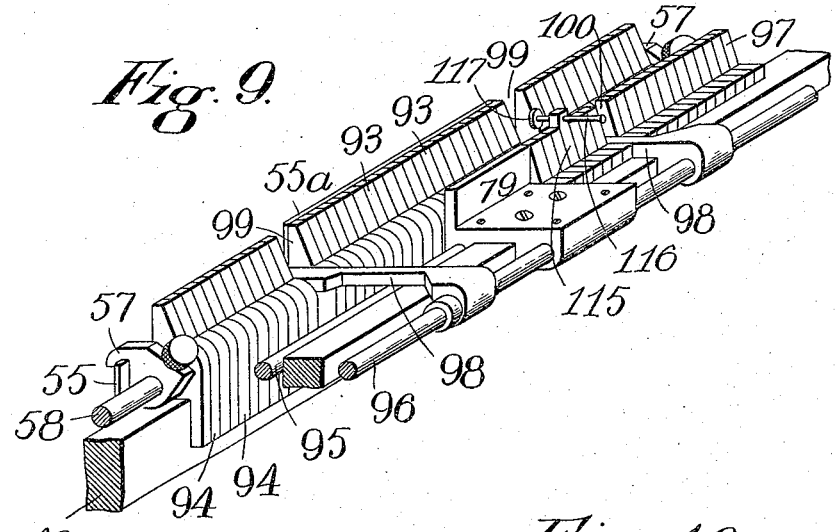
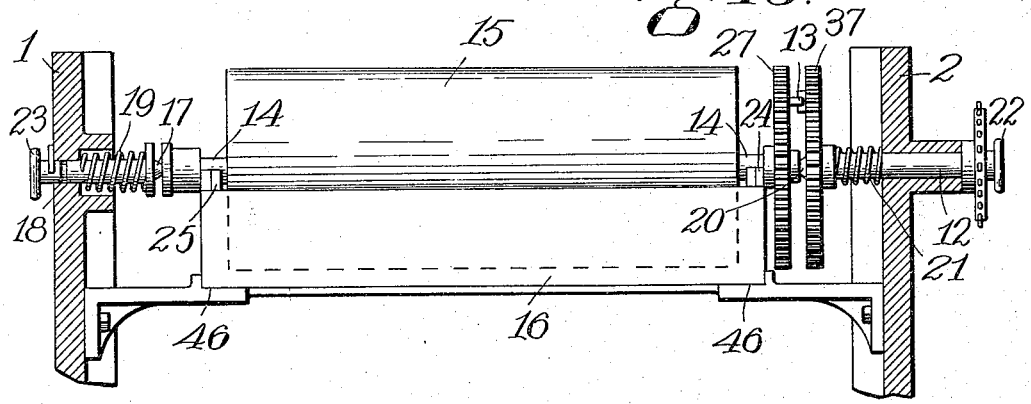
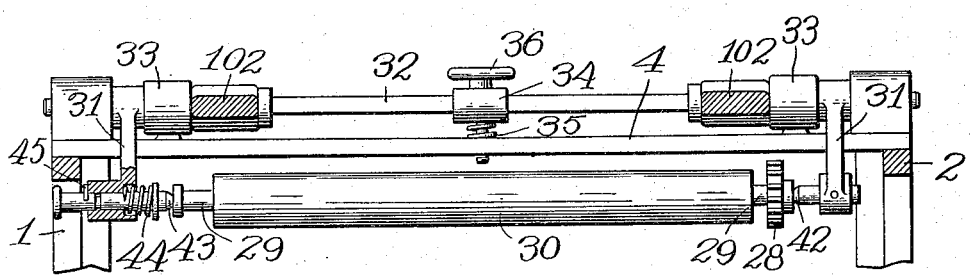
Witnesses
R. D. Tolman
Penelope Comberbach
Inventor
Clarence W. Hobbs
By Rufus B. Fowler
Attorney
THE COLUMBIA PLANOGRAPH CO., WASHINGTON, D. C.

UNITED STATES PATENT OFFICE.

CLARENCE W. HOBBS, OF WORCESTER, MASSACHUSETTS.

FLY-LEAFING MACHINE.

1,171,436.      Specification of Letters Patent.      Patented Feb. 15, 1916.

Application filed November 11, 1911. Serial No. 659,673.

*To all whom it may concern:*

Be it known that I, CLARENCE W. HOBBS, a citizen of the United States, residing at Worcester, in the county of Worcester and Commonwealth of Massachusetts, have invented a new and useful Improvement in Fly-Leafing Machines, of which the following is a specification accompanied by drawings, forming a part of the same.

My invention relates to certain improvements in that class of machines which are employed for automatically attaching fly-leaves to the inside of cardboard boxes, and particularly to that type of fly-leafing machines adapted to attach fly-leaves taken from a stack or bunch of individual leaves, comprising mechanism for applying gum to the inner side of the box and pressing the gummed box against a fly-leaf, with its edge overlapping the gum surface upon the inside of the box.

The objects of my invention are to provide means for facilitating the application of the box to the machine and positioning the box in registration with the fly-leaf to be applied thereto; to provide means for determining the operation of the pressing mechanism by the presence of a box in position to be operated upon; to render the gum mechanism more accessible to the operator; to render the operative parts of the machine more compact and certain in their operation; and in general to increase the efficiency and rapidity of operation of the machine. These objects among others, I accomplish by the construction and arrangement of parts as hereinafter described and pointed out in the annexed claims.

Figure 1:
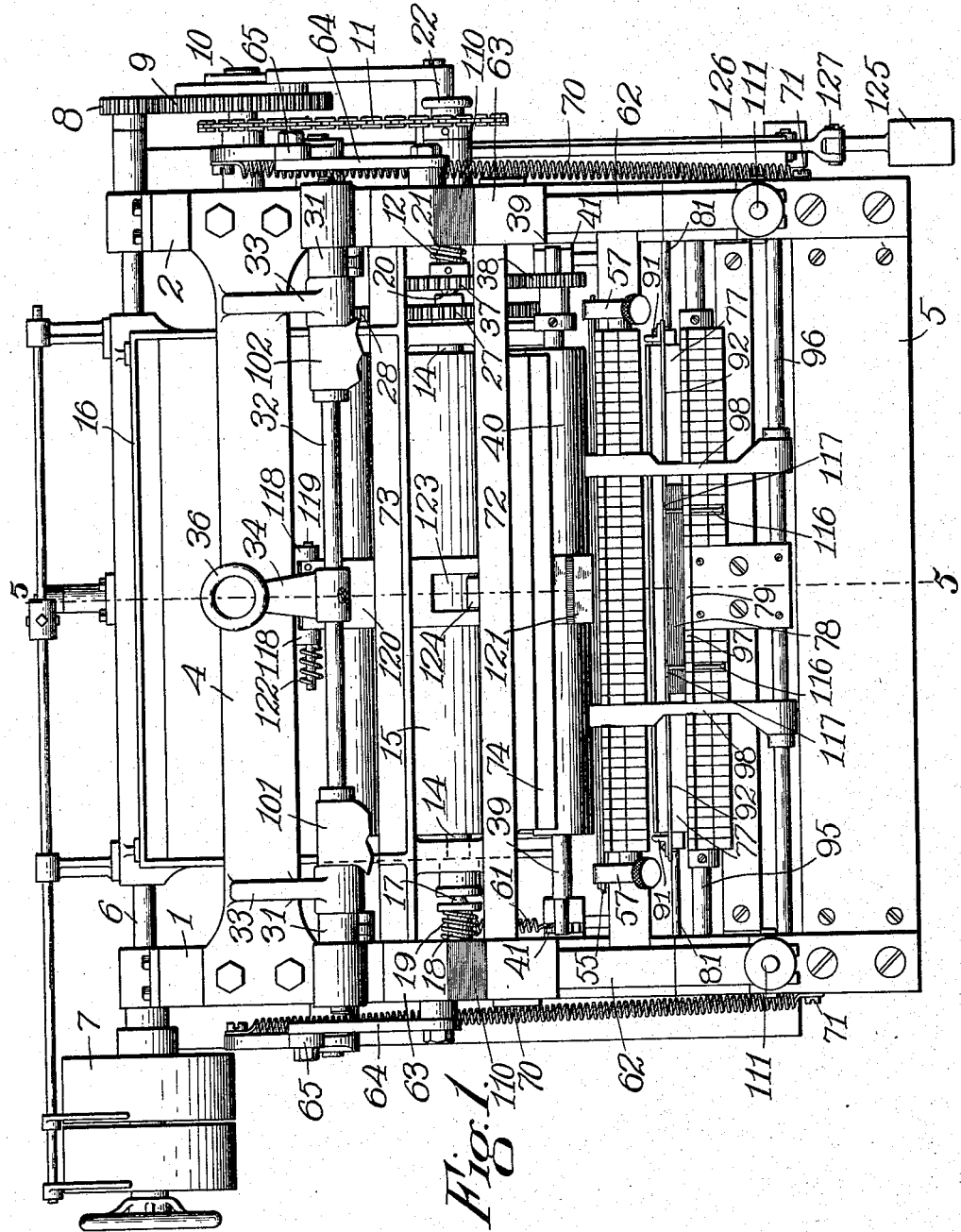
Figure 2:
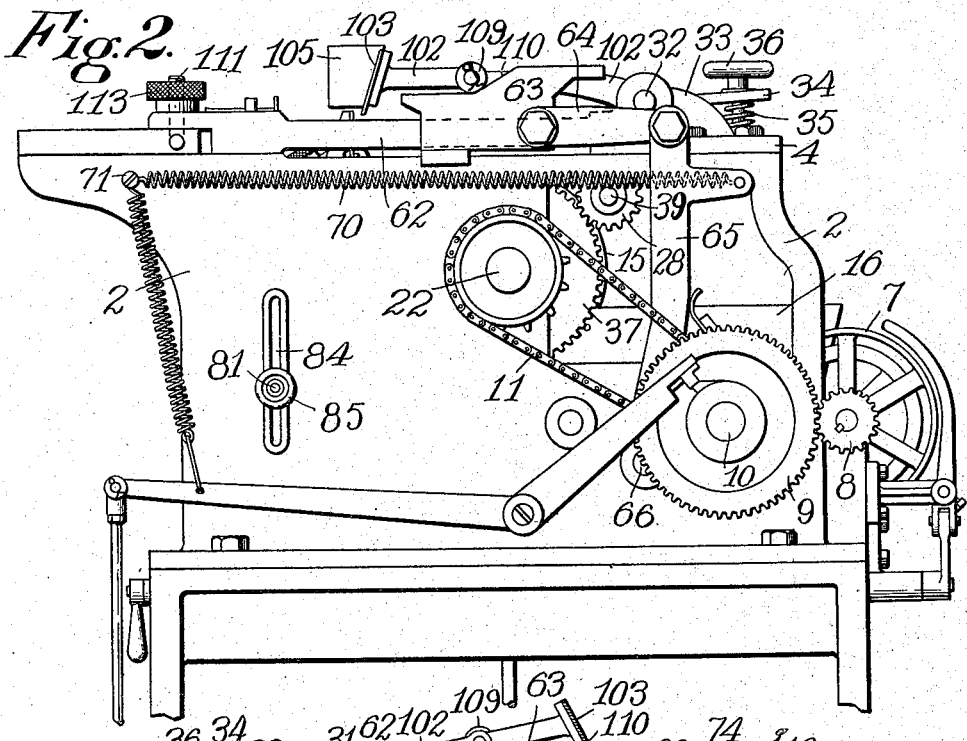
Figure 6:
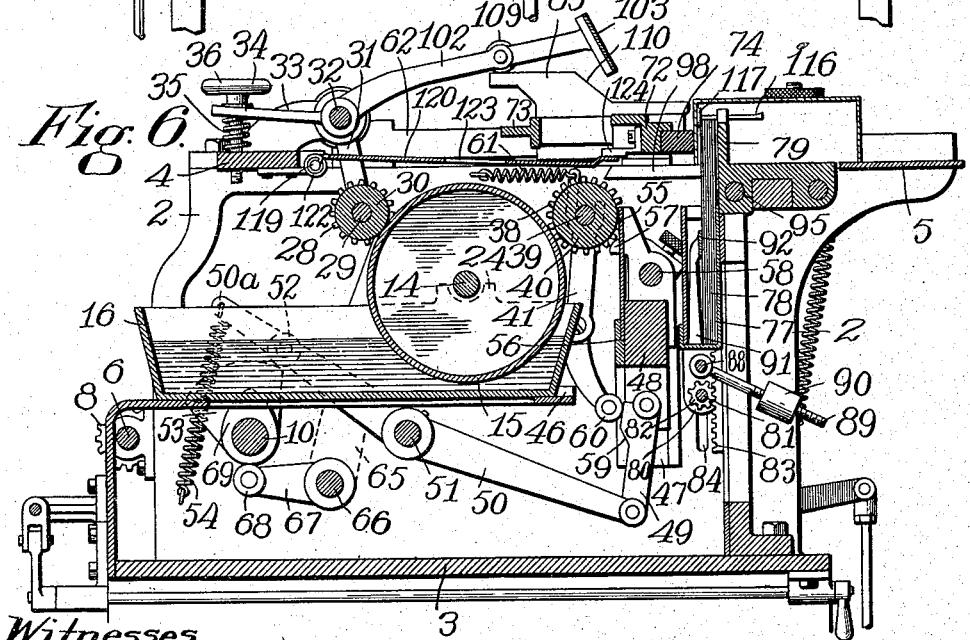

In the accompanying five sheets of drawings, Figure 1 represents a plan view of a fly-leafing machine embodying my invention. Fig. 2 is a side elevation representing that side at the right hand of the operator. Fig. 3 is a front view. Fig. 4 is a side view representing the side at the left of the operator. Fig. 5 is a vertical sectional view on the plane of the broken line 5—5, Fig. 1, showing the operative parts in position for the application of a box to the machine. Fig. 6 is a vertical sectional view on the plane of the broken line 5—5, Fig. 1, showing the position of the operative parts in the act of pressing a box against a fly-leaf. Fig. 7 is a detached view of the fly-leaf separating device. Fig. 8 is a detached view of the clamp for holding the gum plate in position. Fig. 9 is a perspective view of the adjustable fingers for positioning the box during the operation of gumming and applying a fly-leaf thereto. Fig. 10 is a front elevation of the gum box and gum roll. Fig. 11 is a front elevation of the ductor roll.

Similar reference letters and figures refer to similar parts in the different views.

The operative parts of the machine embodying my present invention are mounted in a framework comprising the side frames 1 and 2, mounted upon a stand 3, and united at the rear by a cross-bar 4. Supported upon the sides 1, 2, at the front of the machine and next the operator is a horizontal shelf 5. Journaled in bearings at the rear end of the machine is a countershaft 6 receiving motion through a belt pulley 7 and imparting rotation through a pinion 8 and gear 9 to a cam shaft 10. The cam shaft 10 is connected by means of a sprocket chain 11 with a short shaft 12 journaled in the side frame 2. The inner end of the shaft 12 has a clutch connection 13, Fig. 10, with a shaft 14 of a gum roll 15 which rotates partially immersed in adhesive material contained in a gum box 16. The opposite end of the shaft 14 is counterbored to fit the conical end 17 of a spindle 18 held in the side frame 1, and capable of sliding longitudinally therein, but held in engagement with the shaft 14 by the tension of a spring 19 inserted between a shoulder on the spindle 18 and the end wall of an annular chamber in the side frame 1.

The inner end of the shaft 12 is provided with a conical tip 20 which fits a corresponding counterbore in the end of the gum roll shaft 14. The shaft 12 is capable of sliding in its bearing to allow it to be withdrawn from the shaft 14 with which it is held in engagement by the tension of a spring 21. For convenience of manipulation the shaft 12 is provided at its outer end with a small knob 22 and the sliding spindle 18 is provided with a similar knob 23.

In its operative position the gum roll 15 is supported upon the conical tips 17 and 20 of the spindle 18 and shaft 12. Upon the upper edges of the sides of the gum box 16 are formed two seats 24 and 25 adapted to receive the shaft 14 of the gum roll 15 when the latter has been released from the conical tips 17 and 20 and allowed to drop by gravity into the seats 24 and 25. The seats 24 and 25 are sufficiently close to the shaft 14 when in its operative position to allow the latter to be picked up by the conical tips 17 and 20 through the force of the springs 19 and 21. The sliding spindle 18 and the shaft 12 may be held permanently disengaged from the shaft 14 of the gum roll by any suitable means, such for example, as latches, one of which is shown at 26, Fig. 4, pivoted to the side frame 1 and capable of being dropped between the side frame 1 and the knob 23. The shaft 14 of the gum roll 15 carries a gear 27 which engages a pinion 28 on the shaft 29 of a ductor roll 30, the ratio of the gear 27 and pinion 28 being such that the peripheral speed of the ductor roll 30 and that of the gum roll 15 will be the same.

The ductor roll 30 is journaled in arms 31, 31, attached to a rod 32 journaled in brackets 33 supported by the cross-bar 4. Attached to the rod 32 is an arm 34 extending over the cross-bar 4 with its free end resting upon a spiral spring 35 interposed between the arm 34 and the cross-bar 4. An adjusting screw 36 passes through a slit in the arm 34 and enters the cross-bar 4 for the purpose of adjusting the position of the ductor roll 30 toward or away from the periphery of the gum roll 15, the intervening space between the ductor roll and the gum roll determining the amount of gum which will be carried around the periphery of the gum roll. The shaft 12 carries a gear 37 which engages a pinion 38 on the shaft 39 of a gum transfer roll 40, the ratio of the gear 37 and the pinion 38 being such that the peripheral speed of the transfer roll 40 will be slightly less than the peripheral speed of the gum roll 15, so that when the two rolls run in contact a rubbing action will occur between the peripheries of the transfer roll and the gum roll. The shaft 39 is journaled in the forked ends of levers 41, 41, pivoted to the inner sides of the side frames 1 and 2.

The shaft 29 of the ductor roll is held, like the shaft 14 of the gum roll, upon centers 42, 43, as shown in Fig. 11. The center 43 is capable of sliding in the arm 31 for the purpose of releasing the ductor roll with which it is held in engagement by means of a spiral spring 44 interposed between a shoulder on the center and the end wall of a recess in the arm 31. A latch 45 pivoted on the arm 31 is employed to hold the center 43 out of engagement with the shaft 29. The ductor roll may therefore be released from its bearings and removed from the machine, and the gum roll 14 may be likewise released and allowed to fall by gravity into the seats 24 and 25 and be supported by them upon the gum box 16.

The gum box 16 is held upon horizontal ways 46, Figs. 5 and 6, allowing the gum box and gum roll supported thereon to be removed together from the rear side of the machine. Capable of sliding vertically in ways 47, Figs. 5 and 6, is a frame 48, connected on opposite sides of the machine by links 49 with levers 50 attached to a rock shaft 51. The rock shaft 51 also carries an arm 50ª provided with a cam roll 52 which is held in contact with a cam 53 on the cam shaft 10 by means of a spiral spring 54 by which a properly timed vertical movement is imparted to the frame 48. Removably supported upon the frame 48 is a gum plate 55 with its lower edge clamped in a groove 56 of the frame 48 by means of clamps 57, 57, Figs. 1 and 8, said clamps being held on a rod 58 carried by the frame 48. The central portion of the gum plate 55 is extended upward, as shown at 55ª, Fig. 9. The length of the upwardly extended portion 55ª is substantially equal to the inside length of the box to which the fly-leaves are to be applied.

When boxes of other lengths are to be treated the gum plate is removed and other gum plates substituted having the upwardly extended portion 55ª of a suitable length to correspond with the inside length of the box. The links 49 by which the vertically moving frame 48 is connected to its actuating levers 50 are provided with cam surfaces 59, one of which is shown in Figs. 5 and 6.

The lower ends of the levers 41 in which the transfer gum roll is carried, are provided with cam rolls 60 which are held against the cam surfaces 59 by means of springs 61 connecting the upper ends of the levers 41 with the framework. The action of the cam surfaces 59 is to rock the levers 41 and cause the transfer roll 40 to be swung at the proper time back and forth between the gum roll 15 and the gum plate 55.

In Fig. 5 the transfer roll 40 is shown in contact with and in position to receive gum from the gum roll 15, while in Fig. 6 the transfer roll 40 is represented as swung forward into contact with and in position to impart gum to the gum plate 55, this swinging movement of the transfer roll 40 being accomplished by the vertical movement of the cam surfaces 59. Capable of sliding in horizontal ways 62, 62, is a carriage 63 connected on opposite sides of the machine by links 64 with the swinging levers 65 which extend downward upon the outside of the side frames 1 and 2 and are attached to a rock shaft 66. The rock shaft 66 carries a radial arm 67 provided at its free end with a cam roll 68 which is held against the periphery of a cam 69 on the cam shaft 10 by means of spiral springs 70, 70, which connect each of the levers 65 with fixed studs 71, 71, projecting from the outer side of the side frames 1 and 2. The carriage 63 comprises two side pieces sliding on the ways 62 and connected together by cross-bars 72 and 73, the cross-bar 72 carrying a yielding presser bar 74, preferably consisting of an elastic rubber block, having its front vertical face 75 opposing the gum plate 55 when the latter is raised in its highest position, as shown in Fig. 5, with sufficient space between the presser bar 74 and gum plate 55 to allow the edge of a box side to be inserted, in the position indicated by the broken lines 76, Fig. 5.

In front of the vertically moving frame 48 and gum plate 55 is a vertically adjustable pocket 77 in which are held the fly-leaves 78. Rigidly supported upon the framework of the machine in front of the upper edges of the fly-leaves 78 is a pressure plate 79 in the horizontal plane of the presser bar 74, said pressure plate 79 being adapted to resist the pressure exerted by the presser bar in pressing the box side against the fly-leaves, as represented in Fig. 6.

The pocket 77 is provided at opposite ends with depending lugs 80 in which is journaled a shaft 81 carrying a pinion 82 engaging a fixed rack 83 attached to the framework of the machine. The shaft 81 extends through vertical slots 84 in the side frames 1 and 2. Attached to one end of the shaft 81 is a knob 85 by which the shaft may be rotated by the operator in order to raise and lower the pocket 77 by the rotation of the pinion 82 along the fixed rack 83. When the pocket 77 has been vertically adjusted it is held in position by tightening a nut 86 on the opposite screw threaded end 87 of the shaft 81. Journaled in the lugs 80 is a second shaft 88, to the center of which is attached a radial arm 89 carrying a weight 90. To the ends of the shaft 88 are attached the arms 91, 91, extending upwardly and carrying at their upper ends a cross-bar 92 adapted to bear against the fly-leaves, as shown in Figs. 5 and 6.

The bar 92 is held against the fly-leaves by the gravity of the weight 90. The extension 55ª of the gum plate is supported on its front side by a series of fingers 93 which are held on the rod 58 and are provided with tail pieces 94 which bear against the front side of the frame 48. Supported in the side frames 1 and 2 are rods 95 and 96. On the rod 95 are supported a series of fingers 97, Fig. 9, upon each side of the pressure plate 79, and having their rear faces in alinement with the rear face of the pressure plate.

In Fig. 9 the fingers 97 are shown on one side only of the pressure plate 79, those upon the nearest side in Fig. 9 having been omitted for clearness of illustration. Hinged upon the rod 96 are the bars 98, 98, extending horizontally rearward across the frame 48 and adapted to support the ends of the box as it is applied to the machine. The bars 98 are slidable on the rod 96 to fit boxes of different lengths, and the fingers 93 are slidable upon the rod 58 by which gaps 99 may be formed between the fingers 93 to receive the horizontal bars 98. The fingers 97 are likewise slidable on the rod 95 to form gaps 100 to receive the horizontal bars 98.

Hinged upon the rod 32 are the arms 101, 102, connected at their front ends by a guide plate 103 having its front surface slightly inclined from a perpendicular to guide the edge of a box placed against it downward into proper position in front of the gum plate 55. The plate 103 is provided with a longitudinal slot 104 for the adjustable attachment of a gage plate 105 provided with a flange 106 resting against the guide plate 103 to which it is attached by a bolt 107. The arms 101, 102, are provided with cam rolls 108, 109, which are held by gravity upon the side pieces of the carriage 63. The side pieces of the carriage 63 are provided with cam surfaces 110 which act to raise the arms 101, 102, and guide plate 103 as the carriage moves forward. When the carriage is in its rearward position the guide plate 103 is in its lowest position, as shown in Figs. 2, 4 and 5, but when the carriage is moved forward the guide plate 103 will be raised into the position shown in Fig. 6. The ways 62 are also hinged upon the rod 32 and their forward ends are normally held against the side frames 1 and 2, by means of bolts 111 pivoted at 112 to the side frames of the machine and capable of swinging in the forked ends of the horizontal ways 62. Screwed upon the bolts 111 are nuts 113, which may be loosened, allowing the bolts to be swung free from the forked ends of the horizontal ways 62, allowing the latter to be raised. Detachably held upon the rod 95 by a spring 114 are fingers 115, one of which is shown in Fig. 7, and sliding in the upper end of the fingers 115, are spindles 116 having upon their rear ends heads 117 which overlap the edges of the fly-leaves 78 and serve as separators to prevent more than one fly-leaf from being removed by its attachment to the gummed box.

Journaled in lugs 118, 118, Fig. 1, projecting from the cross-bar 4 is a spindle 119 to which is attached a latch plate 120 which extends forward beneath the presser bar 74 and across the gap between the presser bar 74 and the gum plate 55, with the forward end 121 adjacent to the gum plate slightly raised, as shown in Fig. 5, to bring it in the path of a box side as the latter is inserted between the gum plate 55 and the presser bar 74. The latch plate 120 is normally held in a raised position in contact with the preser bar 74 by means of a torsional spring 122 attached to the spindle 119 and to one of the lugs 118.

The plate 120 is provided with an opening 123 adapted to receive a shouldered plate 124 attached to the rear side of the cross-bar 72. The shoulder on the plate 124 engages the latch plate 120 when the carriage 63 is in its rearmost position and holds the carriage from forward movement, except as the latch plate is depressed by the pressure of a box side upon its forward end 121. The pressing mechanism is thereby rendered inoperative unless a box is in position between the presser bar 74 and the gum plate 55.

The operation of my fly-leafing machine is as follows:—In the position of the parts shown in Fig. 5 a box is applied in the position indicated by the broken lines 76, the edge of the box being guided by the guide plate 103 and the gage plate 105 into position. As the side of the box resting upon the end 121 of the latch plate 120 is pressed down the latch plate is depressed, thereby releasing the shouldered plate 124 and allowing the carriage bearing the presser plate 74 to move forward and force the side of the box against the gum plate 55 which it is assumed has already received a coating of gum by the traversing movement of the transfer roll 40. A clutch mechanism interposed between the gear 9 and the cam shaft 10 of any known construction capable of imparting a complete rotation to the cam shaft and becoming automatically disengaged, is then released by means of a foot treadle 125 operatively connected with said clutch by a lever 126 and link 127, Fig. 1, causing a single revolution to be imparted to the cam shaft 10. The rotation of the cam shaft 10 moves the cam 69 to permit the tension of the springs 70 to carry the presser bar 74 against the gum plate 55. The cam 53 acting against the cam roll 52 rocks the shaft 51 and depresses the frame 48 and gum plate 55, causing the box side in contact with the gum plate to wipe the gum therefrom. As the gum plate moves downward the cams 59 rock the levers 41 to swing the transfer roll into contact with the gum plate, as shown in Fig. 6. When the box has been released from the gum plate the springs 70 continue the forward movement of the presser bar 74 carrying the side of the box to which gum has been applied against the rearmost fly-leaf held in the pocket 77. The pressure exerted by the yielding presser bar 74 is received by the pressure plate 79 supplemented on either side by the fingers 97, the ends of the box meanwhile resting upon the horizontal bars 98. The adhesion of the rearmost fly-leaf to the gummed side of the box as the latter is removed will cause the attached fly-leaf to be drawn out from beneath the head 117 of the separator spindle and also from beneath the cross-bar 92. The completed rotation of the cam shaft 10 restores the parts to the position shown in Fig. 5 ready for the application of the succeeding box. The latch plate 120 again engages the shouldered plate which holds the presser bar 74 against forward movement until the latch plate has been depressed by the insertion of a box.

I claim,

1. In a fly-leafing machine, means for supporting a pad of fly-leaves, means for positioning a box relatively thereto, means for gumming the box, means for pressing the gummed surface of the box against the pad of fly-leaves, and means for locking the pressing means from movement arranged to be released by a box when in position.

2. In a fly-leafing machine, means for gumming the inner surface of a box side, means for holding a pad of fly-leaves, means for pressing the gummed surface of the box against the exposed fly-leaf in said pad, and means for registering a box with said gumming and pressing means, consisting of an inclined guide plate and a gage plate inclined in a plane at an angle to said guide plate and adjustably attached thereto.

3. In a fly leafing machine, a stationary pressing member, a reciprocating carriage having a movable pressing member, a beveled guide plate having a pivotal connection with the framework and normally held in position to guide a box between the pressing members, cam surfaces formed on said carriage operating to raise the guide plate as the carriage moves forward, and means for determining the position of the box after the guide plate has been raised.

4. In a fly leafing machine, a stationary pressing member, a reciprocating carriage, a movable member carried by said carriage, a spring for moving said carriage forward, means for holding said carriage from forward movement capable of being released by the insertion of a box, a movable frame, a gum plate carried by said movable frame, separable fingers supporting said gum plate against pressure, and means for moving said gum plate from its raised position between said pressing members to a position below said pressing members.

5. In a fly-leafing machine, a pocket for fly-leaves, a pressure plate in front of the fly-leaves held in said pocket, a reciprocating presser bar coöperating with said pressure plate to press a box against a fly-leaf, a fixed rod held by the framework of the machine, a finger detachably supported on said rod, a spindle slidable in said finger provided with a head overlapping the fly-leaves held in said pocket.

6. In a fly-leafing machine, a gum box, slidable in horizontal ways on the framework of the machine, a gum roll, a driving mechanism for said gum roll, means for releasing said gum roll from its driving mechanism, and seats on said gum box for supporting said gum roll when released from its driving mechanism.

7. In a fly leafing machine, a stationary pressing member, a movable pressing member, a frame adapted to be interposed between said members at intervals, a gum plate carried by said frame, and a series of separable fingers, carried by said frame, in supporting relation to said gum plate.

8. In a fly leafing machine, a frame, a gum plate detachably secured thereto, a rod carried by said frame, a plurality of supporting members carried by said rod, and capable of sliding movement thereon, to vary the number of members which are effective as supports when gum plates of different sizes are employed.

9. In a fly leafing machine, a frame, a gum plate detachably secured thereto, a rod carried by said frame, a plurality of gum plate supporting members carried by said rod, and capable of sliding movement thereon, a second rod carried by said frame, a pair of bars hinged to said second rod, and slidable thereon, said bars adapted to be spaced apart on said second rod at varying distances, and projecting between the gum plate supporting members.

10. In a fly leafing machine, a frame, a gum plate carried thereby, a plurality of movable members carried by said frame capable of supporting said gum plate, and a pair of spacing members, also carried by said frame, for separating the supporting members selected to support the gum plate, from the remainder of said members.

11. In a fly leafing machine, a frame, a gum plate carried thereby, a plurality of fingers, slidable with respect to said gum plate and carried by said frame, part of said fingers adapted to be grouped together in supporting relation to said gum plate, and spacing members, also carried by said frame, and projecting between and beyond said fingers, for separating the supporting fingers from the idle ones.

CLARENCE W. HOBBS.

Witnesses:
PENELOPE COMERBACH,
NELLIE WHALEN.

Copies of this patent may be obtained for five cents each, by addressing the "Commissioner of Patents, Washington, D. C."